United States Patent
Lim et al.

(10) Patent No.: US 10,095,668 B2
(45) Date of Patent: Oct. 9, 2018

(54) TEXT AUTOMATIC RESPONSE SERVICE PROVIDING METHOD, TEXT AUTOMATIC RESPONSE SERVICE DEVELOPMENT TOOL PROVIDING METHOD AND SERVER, AND EXTENSIBLE MARKUP LANGUAGE GENERATING METHOD

(71) Applicant: KT Corporation, Seongnam-si, Gyeonggi-do (KR)

(72) Inventors: Ji-in Lim, Seoul (KR); Kyu-ho Lee, Yongin-si (KR); Min-chul Kim, Seoul (KR); Sang-hoon Yeo, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 316 days.

(21) Appl. No.: 14/901,300

(22) PCT Filed: Nov. 27, 2013

(86) PCT No.: PCT/KR2013/010871
§ 371 (c)(1),
(2) Date: Dec. 28, 2015

(87) PCT Pub. No.: WO2014/208833
PCT Pub. Date: Dec. 31, 2014

(65) Prior Publication Data
US 2016/0124923 A1   May 5, 2016

(30) Foreign Application Priority Data
Jun. 28, 2013 (KR) .................. 10-2013-0075366

(51) Int. Cl.
*G06F 17/00* (2006.01)
*G06F 17/22* (2006.01)
(Continued)

(52) U.S. Cl.
CPC ........ *G06F 17/2247* (2013.01); *G06F 3/0482* (2013.01); *G06F 3/04842* (2013.01);
(Continued)

(58) Field of Classification Search
CPC .................................................. G06F 17/2247
See application file for complete search history.

(56) References Cited

U.S. PATENT DOCUMENTS

| 4,807,155 A | * | 2/1989 | Cree | .................... | G06Q 10/109 345/1.1 |
| 8,156,206 B2 | * | 4/2012 | Kiley | ................ | G06F 17/30867 455/310 |

(Continued)

FOREIGN PATENT DOCUMENTS

| JP | 2006-277560 A | 10/2006 |
| KR | 10-2002-0042106 A | 6/2002 |

(Continued)

OTHER PUBLICATIONS

English translation of KR 10-2003-0020915 A, Jung-In Choi, Published Jul. 12, 2003, pp. 1-23 (Year: 2003).*
(Continued)

*Primary Examiner* — Laurie A Ries
(74) *Attorney, Agent, or Firm* — Brundidge & Stanger, P.C.

(57) ABSTRACT

There is provided a method for providing a text automatic response service (ARS) using a text ARS development tool. The method includes allowing a manager device to generate a menu tree by using a web-based text ARS development tool; generating a pre-defined XML document set based on the menu tree; transmitting the XML document set to a text ARS server; and allowing the text ARS server to combine texts included in one of the XML document set to transmit the texts to a user device.

11 Claims, 10 Drawing Sheets

(51) Int. Cl.
*G06F 8/38* (2018.01)
*G06F 3/0482* (2013.01)
*G06F 3/0484* (2013.01)
*G06F 17/24* (2006.01)
*H04L 12/58* (2006.01)
*H04L 29/08* (2006.01)
*G06F 17/30* (2006.01)

(52) U.S. Cl.
CPC ............... *G06F 8/38* (2013.01); *G06F 17/24* (2013.01); *G06F 17/30654* (2013.01); *H04L 51/02* (2013.01); *H04L 51/04* (2013.01); *H04L 67/02* (2013.01)

(56) References Cited

U.S. PATENT DOCUMENTS

| | | | | |
|---|---|---|---|---|
| 8,195,509 B1* | 6/2012 | Mhatre | ................. | G06Q 30/02 705/14.1 |
| 8,504,370 B2* | 8/2013 | Hong | ................. | G10L 15/22 704/200 |
| 2002/0087627 A1* | 7/2002 | Rouse | ................. | H04M 3/493 709/203 |
| 2004/0153509 A1* | 8/2004 | Alcorn | ................. | G06Q 30/06 709/205 |
| 2007/0266141 A1* | 11/2007 | Norton | ............. | H04L 29/12066 709/224 |
| 2010/0211638 A1* | 8/2010 | Rougier | .................... | G06F 8/30 709/205 |
| 2016/0014580 A1* | 1/2016 | Kim | ........................ | H04L 51/02 455/414.1 |

FOREIGN PATENT DOCUMENTS

| | | |
|---|---|---|
| KR | 10-2003-0060082 A | 7/2003 |
| KR | 10-2004-0023990 A | 3/2004 |
| KR | 10-2004-0085539 A | 10/2004 |
| KR | 10-2006-0002410 A | 1/2006 |
| KR | 10-2008-0008573 A | 1/2008 |
| KR | 10-2009-0098055 A | 9/2009 |

OTHER PUBLICATIONS

English translation of JP 2006-277560, Saito Airi, NEC Corporation, published Dec. 10, 2006, pp. 1-15. (Year: 2006).*
English translation of KR 10-2000-0071855, Jung-In Choi, published Jun. 5, 2002, pp. 1-14 (Year: 2002).*
International Search Report dated Mar. 27, 2014 for Application No. PCT/KR2013/010871.

* cited by examiner

FIG. 6

```
<mxml>
<message>
We are Olleh mobile product messaging customer service center. Welcome customers.
1. Bill check and payment service
2. Cell phone new subscription, number porting, device change and additional services, rate plan change, olleh club, membership
3. Inquiry on use of i-phone and i-pad and call quality
4. Loss, temporary suspension, handset insurance related inquiry and AS information
5. Inquiries on a cell phone and wired products such as Internet, home phone and Wibro.
?. Helps
!. Usage information
</message>
    <choice value="1" next="Bill check and payment service.mxml"/>
    <choice value="2" next="additional services/rate plan.mxml"/>
    <choice value="3" next="Inquiry on use of i-phone and i-pad and call quality.mxml"/>
    <choice value="4" next="Loss/temporary suspension/handset insurance.mxml"/>
    <choice value="5" next="Home products/Wibro/integrative counseling.mxml"/>
</mxml>
```

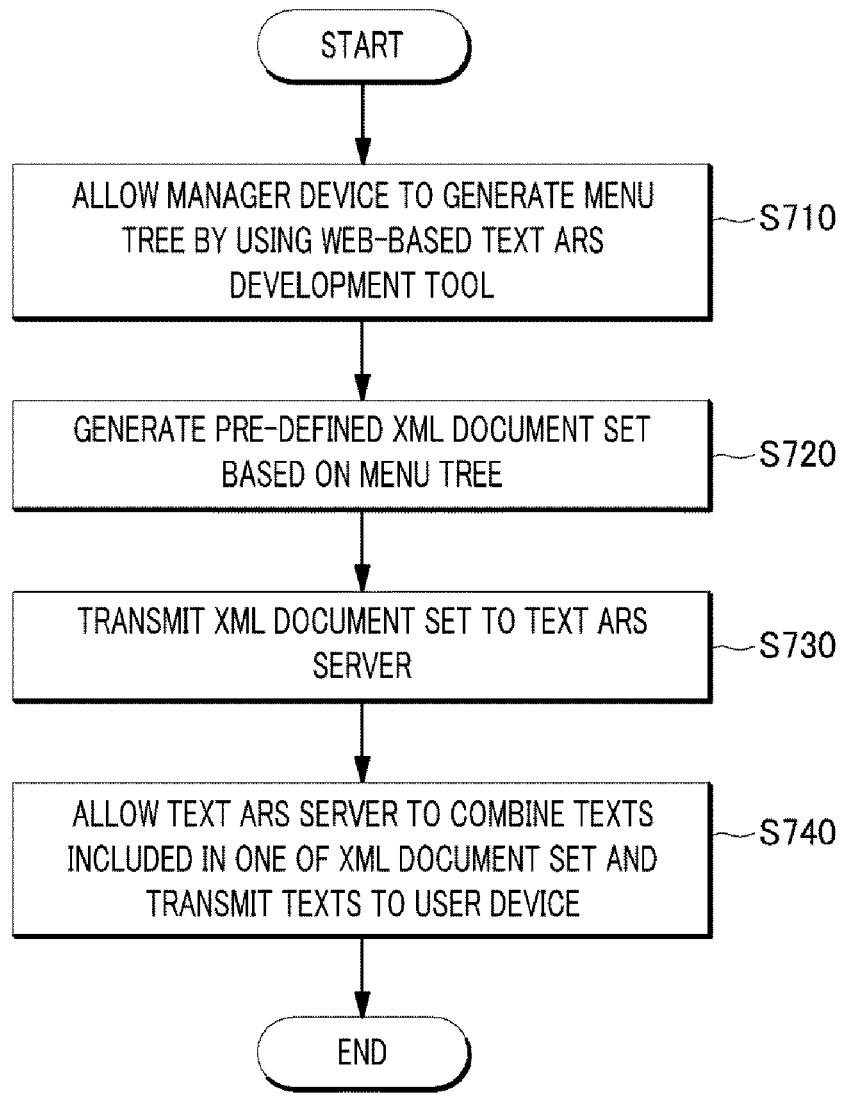

ly to a text automatic response service providing method, a text automatic response service development tool providing method and server, and an extensible markup language generating method.

TEXT AUTOMATIC RESPONSE SERVICE PROVIDING METHOD, TEXT AUTOMATIC RESPONSE SERVICE DEVELOPMENT TOOL PROVIDING METHOD AND SERVER, AND EXTENSIBLE MARKUP LANGUAGE GENERATING METHOD

TECHNICAL FIELD

The embodiments described herein pertain generally to a text automatic response service providing method, a text automatic response service development tool providing method and server, and an extensible markup language generating method.

BACKGROUND ART

An automatic response service (ARS) system refers to an automatic response system, which saves various types of information as voice content in a memory and then informs a user of a method to search his/her desired information through a help of guidance voice when he/she accesses the ARS system by a telephone, and provides the user with necessary information through voice when the user finds the information.

The latest ARS system is generated in a markup language, i.e., voice XML (VXML). VXML provides various input and output functions to receive user's voice by using an output function to play a recorded voice file and buttons and a voice recognition function of a mobile device, in addition to a voice synthesis technology like the text to speech (TTS) conversion technology. With respect to the ARS system using VXML, Korean Patent Application Publication No. 2004-0023990 as a conventional technology describes an ARS hosting system through Internet and a service method using the system.

However, when a user uses the voice ARS system in a noisy space, the user should concentrate on ARS voice, and needs to repeat the voice of the ARS system in the event that he/she fails to understand the ARS voice. In order to overcome such inconvenience, a method for providing a visual ARS system is being demanded.

DISCLOSURE OF THE INVENTION

Problems to be Solved by the Invention

Example embodiments provide a text ARS service providing method, which constructs a text ARS service by using a new development language, e.g., message XML (MXML), rather than voice XML (VXML) used for conventional ARS development.

In addition, example embodiments provide a text ARS development tool, which enables a developer of a text ARS service to more easily develop user interface (UI) for a service that the developer desires to develop.

In addition, example embodiments provide a text ARS service providing method, which uses a text ARS development tool, and by which user interface provides a platform enabling each menu belonging to a service menu to provide a text ARS function, so that an ordinary person can also easily develop a text ARS service. However, the problems sought to be solved by the present disclosure are not limited to the above description, and other problems can be clearly understood by those skilled in the art from the following description.

Means for Solving the Problems

In accordance with an example embodiment, there may be provided a method for providing a text automatic response service (ARS) using a text ARS development tool. The method includes: allowing a manager device to generate a menu tree by using a web-based text ARS development tool; generating a pre-defined XML document set based on the menu tree; transmitting the XML document set to a text ARS server; and allowing the text ARS server to combine texts included in one of the XML document set to transmit the texts to a user device.

In accordance with another example embodiment, there may be provided a method for providing a text ARS development tool. The method includes: receiving a request for a web-based text ARS development tool from a manager device; and providing the manager device with the web-based text ARS development tool, wherein the web-based text ARS development tool is configured to implement the following steps in the manager device: generating a menu tree for a text ARS; editing the generated menu tree; and generating a pre-defined XML document set based on the edited menu tree.

In accordance with still another example embodiment, there may be provided a method for generating XML using a text ARS development tool. The Method includes: transmitting a request for a text ARS development tool to a development tool providing server; receiving the text ARS development tool from the development tool providing server; generating a menu tree for text ARS by using the text ARS development tool; editing the generated menu tree by using the text ARS development tool; and converting the edited menu tree into a pre-defined XML document set by using the text ARS development tool.

In accordance with still another example embodiment, there may be provided a server for providing a text ARS development tool. The server includes: a receiver configured to receive a request for a web-based text messages ARS development tool from a manager device; and a transmitter configured to provide the manager device with the web-based text ARS development tool, wherein the web-based text ARS development tool is configured to perform the following steps in the manager device: generating a menu tree for a text ARS; editing the generated menu tree; and generating a pre-defined XML document set based on the edited menu tree.

Effect of the Invention

In accordance with the example embodiments, it is possible to provide a text ARS service providing method, which constructs a text ARS service by using a new development language, e.g., message XML (MXML), rather than voice XML (VXML) used for conventional ARS development.

In addition, it is possible to provide a text ARS development tool, which enables a developer of a text ARS service to more easily develop user interface (UI) for a service that the developer desires to develop.

In addition, it is possible to provide a text ARS service providing method, which uses a text ARS development tool, and by which user interface provides a foundation enabling each menu belonging to a service menu to provide a text ARS function, so that an ordinary individual can also easily develop a text ARS service.

BRIEF DESCRIPTION OF THE DRAWINGS

FIG. 6 shows an example for an XML document generated by using the text ARS development tool in accordance with an example embodiment.

FIG. 7 is a flow chart showing a text ARS service providing method that uses the text ARS development tool in accordance with an example embodiment.

*EXPLANATION OF CODES*

Figure 1A:
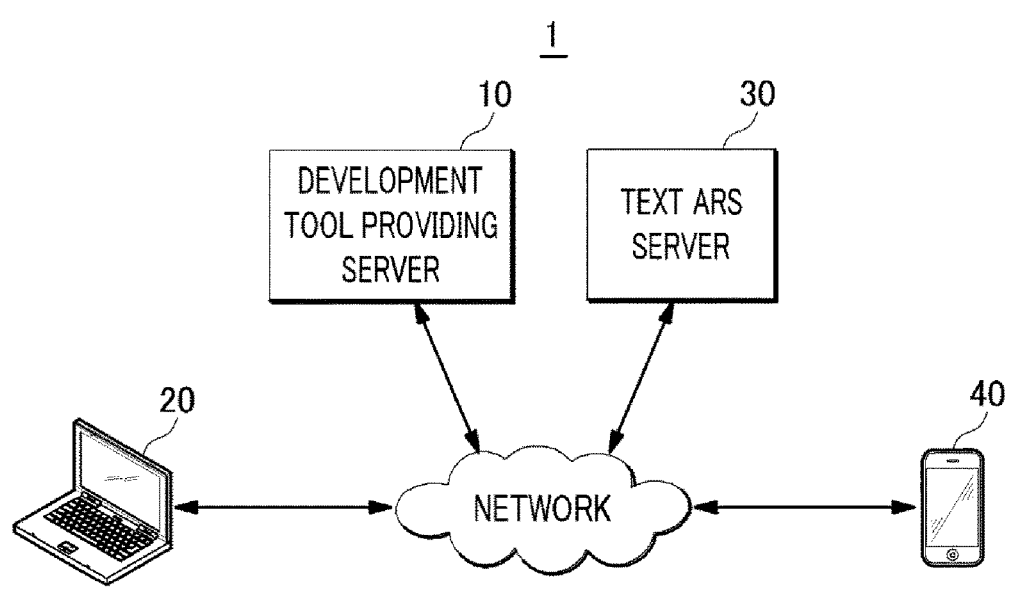
FIG. 1A is a configuration diagram of a text ARS service providing system in accordance with an example embodiment.

10: Development tool providing server
11: Reception unit
12: Transmission unit
20: Manager device
30: Text ARS server
40: User device

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Hereinafter, the example embodiments are described in detail with reference to the accompanying drawings.

FIG. 1A is a configuration diagram of a text ARS service providing system in accordance with an example embodiment. Referring to FIG. 1A, the text ARS service providing system 1 may include a development tool providing server 10, a manager device 20, a text ARS server 30 and a user device 40. In this case, the development tool providing server 10, the manager device 20, the text ARS server 30, and the user device 40 illustrated in FIG. 1A are exemplary components that can be controlled by the text ARS service providing system 1.

The components of the text ARS service providing system 1 of FIG. 1A are generally connected to one another through a network. For example, as illustrated in FIG. 1A, the text ARS server 30 may be connected to the manager device 20 through a network. In addition, the text ARS server 30 may be connected to the user device 40 through a network. As another example, the manager device 20 may be connected to the development tool providing server 10 through a network.

The network means a connection structure that enables information exchange between nodes such as devices and servers, and includes, for example, Wi-Fi, Internet, a local area network (LAN), a wireless local area network (wireless LAN), a wide area network (WAN), a personal area network (PAN), 3G, 4G, LTE and so on, but are not limited thereto.

The development tool providing server 10 receives a request for a web-based text ARS development tool from the manager device 20, and provides the manager device 20 with the web-based text ARS development tool in response to the received request. In this case, the web-based text ARS development tool is configured to be executed and operated in the manager device 20. For example, a user of the manager device 20 may generate a menu tree for text ARS through the web-based text ARS development tool. The text ARS development tool is embodied such that when a menu tree for text ARS is generated, a figure or a shape determined according to an attribute of each menu included in the menu tree can be selected, and the attribute of the menu may include one or more of message delivery, conditional branch, input and search. In addition, the generated menu tree may be edited through the web-based text ARS development tool, and a pre-defined extensible markup language (XML) document set may be generated based on the edited menu tree.

The manager device 20 transmits the request for the text ARS development tool to the development tool providing server 10, and receives the text ARS development tool from the development tool providing server 10.

The manager device 20 generates an XML document by using the text ARS development tool provided from the development tool providing server 10. For the generation of the XML document, the manager device 20 generates a menu tree for a text ARS service by using the text ARS development tool.

TABLE 1

| Menu Classification | Functions | Shapes |
|---|---|---|
| General | Message element to be actually delivered to a user | Rectangle |
| Conditional Branch | Element for loading a MXML file or action of a submenu corresponding to a condition | Hexagon |
| Input | Element that defines a step requiring user's direct entering of a resident registration number, a business registration number or the like | Oval |

TABLE 1-continued

| Menu Classification | Functions | Shapes |
|---|---|---|
| Search | Element that incorporates a result value into message contents according to user authentication | Rounded rectangle |
| Dynamic | Element that can draw different result values according to user authentication | Parallelogram |
| By-pass | Element that connects one or more menus to each other without message contents | Chevron |

Referring to Table 1, the manager device 20 may generate each menu based on an attribute of the menu through the text ARS development tool. In this case, the attribute of the menu may include one or more attributes of general (message delivery), conditional branch, input, search, dynamic, and by-pass. The manager device 20 may generate a menu through selection of a certain shape like a rectangle, a hexagon, an oval, a rounded rectangle, a parallelogram, and chevron, according to an attribute of the menu.

For example, the manager device 20 may receive input of selection of a rectangle from the user through the text ARS development tool. In this case, the rectangle means the 'general' menu, and includes a message element to be actually delivered to a user. In addition, the manager device 20 may receive input of selection of a hexagon from the user through the text ARS development tool. In this case, the hexagon means the 'conditional branch' menu, and includes an element for loading a MXML file or action of a submenu corresponding to a condition. In addition, the manager device 20 may receive input of selection of an oval from the user through the text ARS development tool. In this case, the oval means the 'input' menu, and includes an element that defines a step requiring user's direct entering of a resident registration number, a business registration number or the like. In addition, the manager device 20 may receive input of selection of a rounded rectangle from the user through the text ARS development tool. In this case, the rounded rectangle means the 'search' menu, and includes an element that incorporates a result value into message contents according to user authentication. In addition, the manager device 20 may receive input of selection of a parallelogram from the user through the text ARS development tool. In this case, the parallelogram means the 'dynamic' menu, and includes an element that can draw different result values according to user authentication. In addition, the manager device 20 may receive input of selection of a chevron from the user through the text ARS development tool. In this case, the chevron means the 'by-pass' menu, and includes an element that connects one or more menu to each other without message contents.

The manager device 20 may first generate a main menu, and then, generate a multiple number of submenus based on the generated main menu. The manager device 20 may generate one menu tree including the generated main menu and the multiple submenus generated based on the generated main menu.

The manager device 20 edits the generated menu tree by using the text ARS development tool. In this case, the manager device 20 may edit a menu tree generated by the same manager device 20. In addition, the manager device 20 may edit a menu tree generated by another manager device (not illustrated).

The manager device 20 converts the edited menu tree into a pre-defined XML document set by using the text ARS development tool. In this case, the manager device 20 may generate an XML document set including a multiple number of XML documents, by generating an XML document to correspond to each menu included in the menu tree.

Figure 1B:
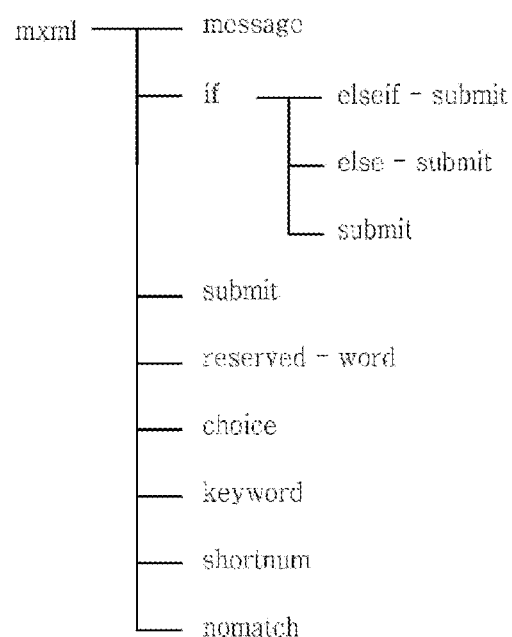
FIG. 1B shows an XML document in accordance with the example embodiment of FIG. 1A.

Referring to FIG. 1B, the XML document may include a multiple number of elements. The multiple elements are the most essential in elements of the XML document, and may include, for example, at least one of mxml, message, if, elseif, else, submit, reserved-word, choice, keyword, shortnum and nomatch. Each of the elements includes attribute information, a parent node, and a children node. In this case, the attribute information is used to add further information to an XML element, and the parent node may include a multiple number of children nodes through a node tree structure. <mxml> is a top-level root element of the MXML document and represents an element starting the MXML document. <mxml> has no attribute information and parent node, and may include, as children nodes, message, if, elseif, else, submit, reserved-word, choice, keyword, shortnum and nomatch. <message> is message contents to be delivered to a customer, and represents an element including contents of a header and a footer. <message> has no attribute information and children node, and may include mxml as a parent node. <if> represents an element for loading of a MXML file or action of a sub-element <submit> corresponding to a condition. <if> may include cond as attribute information, mxml as a parent node, and elseif, else and submit as children nodes. <elseif> represents an element for loading of a MXML file or action of a sub-element <submit> corresponding to an additional condition, rather than a broader condition. <elseif> may include cond as attribute information, mxml and if as parent nodes, and submit as a children node. <else> represents an element for loading of a MXML file or action of a sub-element <submit> corresponding to a condition rather than a broader condition. <else> has no attribute information, and may include mxml and if as parent nodes and submit as a children node. <submit> is a MXML event and represents an element that loads a MXML file corresponding to a 'next' attribute information value. <submit> has no children node, and may include next as attribute information and mxml, if, elseif and else as parent nodes. <reserved-word> is a MXML reserved word and represents an element that requests action to an engine and authentication/search corresponding to a 'name' attribute information value, and delivers a 'code' attribute information value to engine. <reserved-word> has no children node, and may include name and code as attribute information and mxml as a parent node. <choice> is a list of customer's selections, and represents an element that loads a MXML file corresponding to a 'next' attribute information value if a customer selects a 'value' attribute information value. <choice> has no children node, and may include value and next as attribute information and mxml as a patent node. <keyword> represents an element that loads a MXML file corresponding to a 'file' attribute information value if a keyword value input by a customer and a 'name' attribute information value are consistent with each other. <keyword> has no children node, and may include name, menu and file as attribute information and mxml as a parent node. <shortnum> represents an element that loads a MXML file corresponding to a 'file' attribute information value if a shortcut number value input by a customer and a 'value' attribute information value are consistent with each other. <shortnum> has no children node, and may include value and file as attribute information, and mxml as a parent node. <nomatch> represents an element that includes message contents to be delivered to a customer when no value corresponding to a condition exists, or a value input by a customer is inconsistent with a menu number, a keyword or a shortcut number. <nomatch> has no attribute information and children node, and may include mxml as a parent node.

As described above, the manager device 20 may generate the text ARS menu tree by using the text ARS development tool, and generate an XML document corresponding to each menu belonging to the menu tree, so as to provide the text ARS service by using an XML document set including a multiple number of XML documents.

The text ARS server 30 may receive the XML document set from the manager device 20, and store the received XML document set in a database.

When receiving a text message from the user device 40, the text ARS server 30 searches and extracts an XML document corresponding to the received text message from the XML document set. The text ARS server 30 may combine texts included in the extracted XML document to transmit an ARS text message to the user device 40. The ARS text message may be transmitted, for example, in the form of short messages service (SMS) or multimedia message service (MMS).

The user device 40 transmits a text ARS request initiation message to the text ARS server 30, and receives a response message to the text ARS request initiation message from the text ARS server 30. In this case, an identification number of the text ARS server 30 is an ARS main number newly created by a service provider or a conventionally used ARS main number, and an example for the identification number of the text ARS server 30 may be '1588-XXXX.'

When receiving the response message from the text ARS server 30, the user device 40 may display a main menu included in the response message. In this case, the main menu may display, for example, at least one service of bill and payment/cell phone new subscription/number porting/device change and additional services/rate plan change, loss/temporary suspension/handset insurance relevant inquiry and call quality/AS information, olleh club membership and roaming relevant inquiry, inquiry on wired products such as Internet, home phone and Wibro etc., helps, and service charge information.

The user device 40 may receive input of a number corresponding to information that a user needs, from the displayed text ARS main menu, and transmit a text message including the input number to the text ARS server 30. For example, it is assumed that the user device 40 displays "1. Bill and payment 2. Cell phone new subscription/number porting/device change and additional services/rate plan change 3. Loss/temporary suspension/device assurance relevant inquiry and call quality/AS information 4. Olleh club membership and roaming relevant inquiry/inquiry on wired products such as Internet, home phone and Wibro." for a main menu. If the user desires to see his/her mobile phone bill to be charged this month, the number '1' corresponding to the cell phone bill may be transmitted in a text message form to the text ARS server 30.

Examples for the user device 40 may include any type of a handheld-based wireless communication device such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) device, a smart phone, a smart pad, and a tablet PC, but are not limited thereto.

Figure 2:
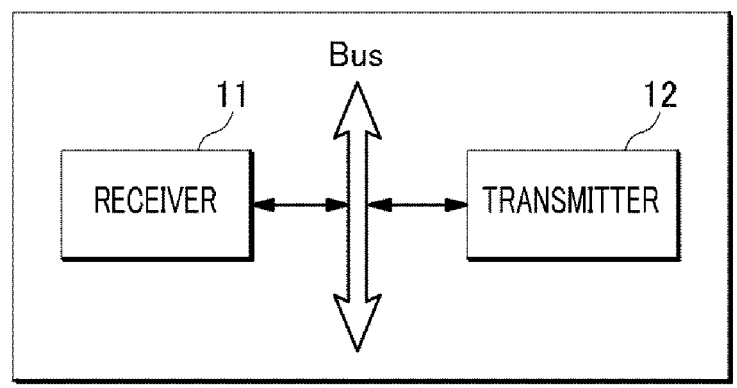
FIG. 2 is an example for a configuration diagram of a text ARS development tool providing server illustrated in FIG. A.

FIG. 2 is an example for a configuration diagram of the text messages ARS development tool providing server in FIG. 1A. Referring to FIG. 1A and FIG. 2, the text ARS development tool providing server 10 may include a reception unit 11 and a transmission unit 12.

However, the text ARS development tool providing server 10 in FIG. 2 is merely an example embodiment, and it can be understood that the text ARS development tool providing server 10 may be modified in various forms by one of ordinary skill in the art based on the components illustrated in FIG. 2. For example, the components and functions thereof can be combined with each other or can be divided.

The reception unit 11 receives a request for the web-based text ARS development tool from the manager device 20.

The transmission unit 12 provides the manager device 20 with the web-based text ARS development tool in response to the received request. In this case, the web-based text ARS development tool is configured to be executed and operated in the manager device 20. For example, the user of the manager device 20 generates a menu tree for text ARS through the web-based text ARS development tool. In this case, the text ARS development tool is embodied to enable selection of a shape according to an attribute of each menu included in the menu tree, and the attribute of the menu may include one or more attributes of message delivery, conditional branch, input, and search. In addition, the generated menu tree may be edited through the web-based text ARS development tool, and a pre-defined XML document set may be generated based on the edited menu tree. In this case, for the generation of the XML document set, the user of the manager device 20 may generate a XML document to correspond to each menu included in the menu tree.

Figure 3:
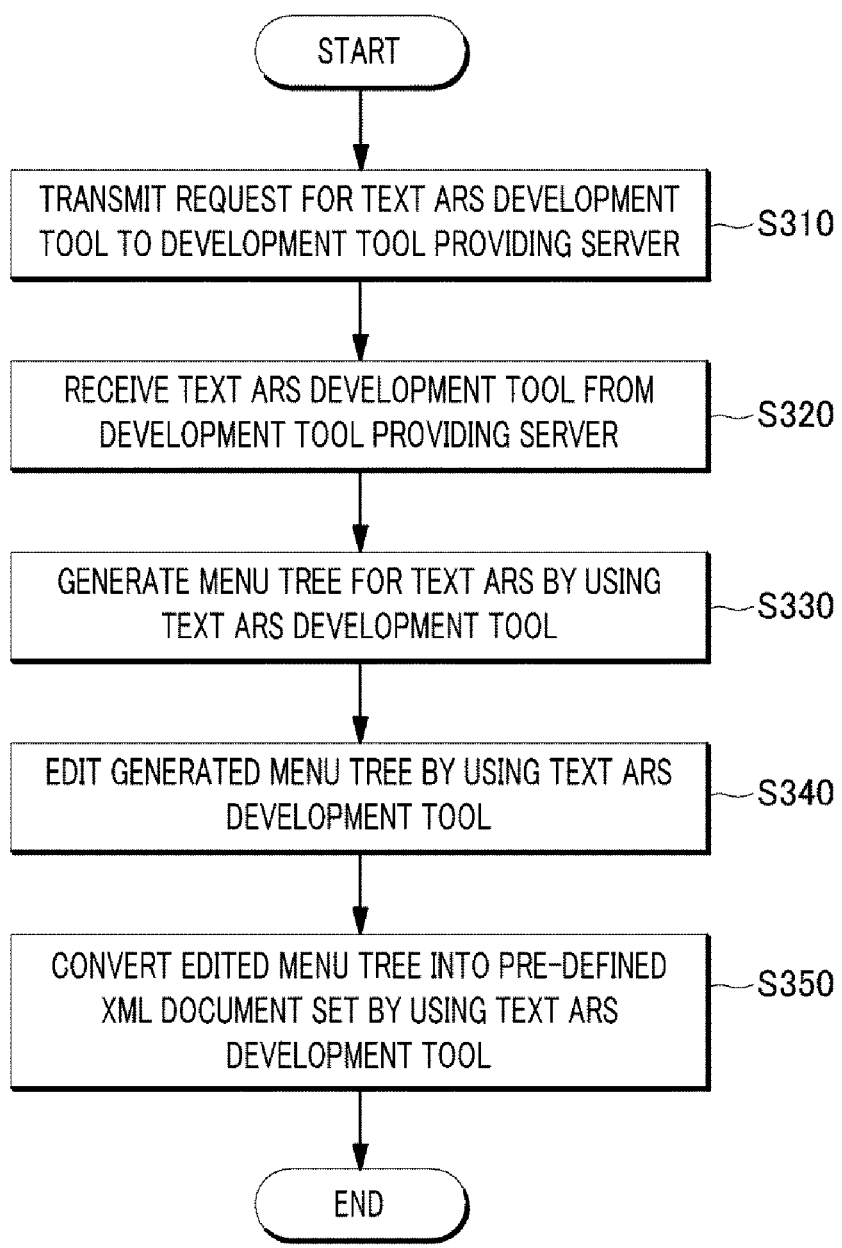
FIG. 3 is a flow chart showing an XML generating method that uses the text ARS development tool.

FIG. 3 is a flow chart showing a XML document generating method that uses the text ARS development tool. Referring to FIG. 3, in S310, the manager device 20 transmits the request for the text ARS development tool to the development tool providing server 10. In S320, the manager device 20 is provided with the text ARS development tool from the development tool providing server 10. In S330, the manager device 20 generates a menu tree for text ARS by using the text ARS development tool. In S340, the manager device 20 edits the generated menu tree by using the text ARS development tool. In S350, the manager device 20 converts the edited menu tree into a pre-defined XML document set by using the text ARS development tool.

Figure 4:
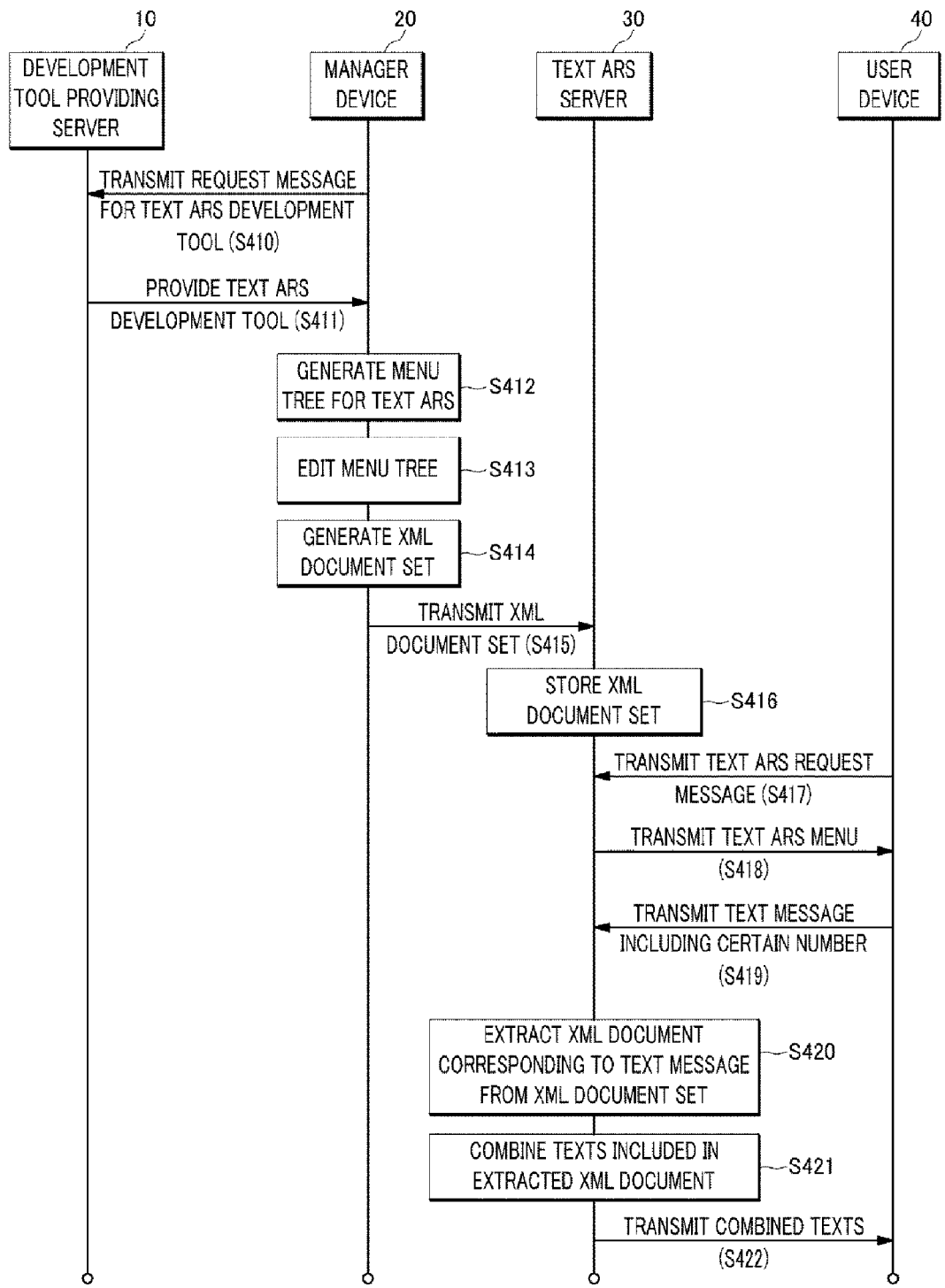
FIG. 4 is a flow diagram showing an example for a process, in which a text ARS service is provided by each component included in the text ARS service providing system of FIG. 1A.

FIG. 4 is a flow diagram showing an example for a process, in which a text ARS is provided by each component included in the text ARS providing system of FIG. 1A. Referring to FIG. 3, the manager device 20 transmits the request message for the text ARS development tool to the development tool providing server 10 (S410). The development tool providing server 10 provides the manager device 20 with the text ARS development tool (S411). The manager device 20 generates a menu tree for text ARS (S412). The manager device 20 edits the generated menu tree (S413). The manager device 20 generates a pre-defined XML document set based on the menu tree (S414). The manager device 20 transmits the generated XML document set to the text ARS server 30 (S415). The text ARS server 30 stores the received XML document set in a database (S416). The user device 40 transmits a text ARS request message to the text ARS server 30 (S417). The text ARS server 30 transmits a menu corresponding to the text ARS request message to the user device 40 (S418). The user device 40 transmits a text message including a certain number to the text ARS server 30 (S419). The text ARS server 30 extracts an XML document corresponding to the received text message from the XML document set (S420). The text ARS server 30 combines texts included in the extracted XML document and other information (e.g., outside search information and customer input information) with each other (S421). The text ARS server 30 transmits the combined texts to the user device 40 (S422).

FIG. 5a to FIG. 5e show examples for the menu tree generated by using the text ARS development tool in accordance with an example embodiment.

Figure 5A:
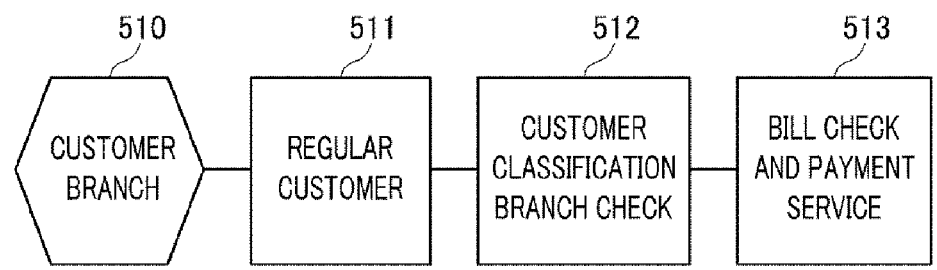
FIG. 5a to FIG. 5e show a menu tree generated by using the text ARS development tool in accordance with an example embodiment.

Referring to FIG. 5a, when receiving a text ARS initiation request from the user device 40, the text ARS server 30 may check the customer state of the user device 40 through a customer branch 510. For example, the customer state of the user device 40 may be a VIP customer, a regular customer and a customer in arrears.

For example, if the customer state of the user is a regular customer 511, the text ARS server 30 may transmit the ARS text message "Please send a service number you want. You can enter and send the number or symbol next to the service name for a text message. 1. Bill and payment 2. Cell phone new subscription/number porting/device change and additional services/rate plan change 3. Loss/temporary suspension/handset insurance relevant inquiry and call quality/AS information 4. Olleh club membership and roaming relevant inquiry 5. Inquiry on wired products such as Internet, a home phone and Wibro. ?. Helps !. Service charge information" to the user device 40.

As another example, if the customer state of the user is a VIP customer, the text ARS server 30 may transmit the ARS text message "Dear VIP customer. Welcome." to the user device 40. As another example, if the customer state of the user is a customer in arrears, the text ARS server 30 may transmit the text ARS message "Dear customer! The amount unpaid is 0,000 Won." to the user device 40.

For example, when receiving a text message including '1' corresponding to the bill and payment from the user device 40, the text ARS server 30 checks a customer classification branch check 512 corresponding to the user device 40. Based on the checked customer classification branch check, the text ARS server 30 may transmit an ARS text message including a submenu of a bill and payment service 513 to the user device 40. In this case, the ARS text message may include, for example, "Please send a service number you want. 1. Bill check 2. Real-time current monthly charge check 3. Remaining free call/free text message credit check 4. Payment dedicated account information 5. Fax forward of a billing statement 6. Non-refunded amount check #. Back to previous menu *. Back to the beginning."

Figure 5B:
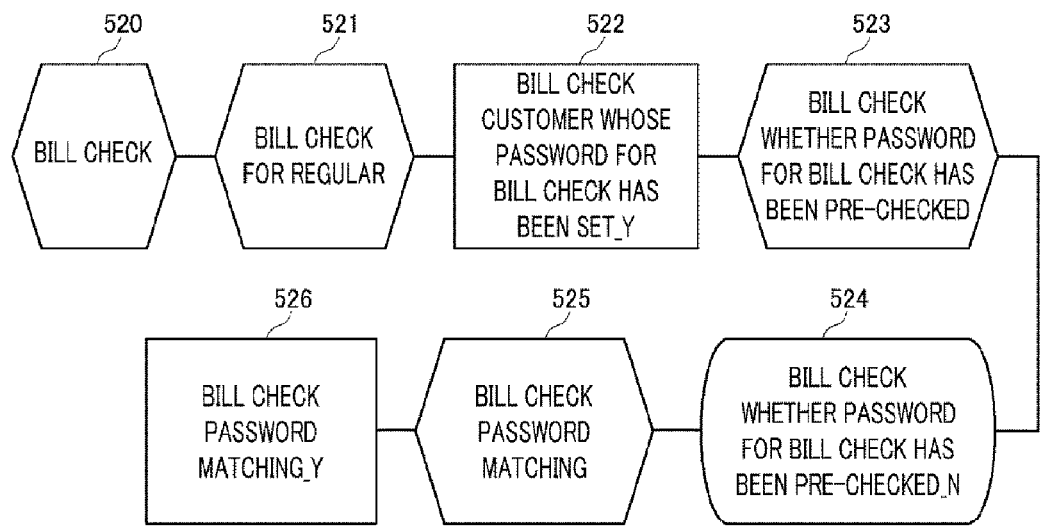

Referring to FIG. 5b, when receiving a text message including '1' corresponding to the bill check 520 from the user device 40, the text ARS server 30 may check a customer type of the user. In this case, the customer type may be either a regular customer or a corporate customer. If the customer type of the user is 'regular,' the text ARS server 30 proceeds with a 'bill check for regular 521' step of the text ARS to check whether the user is a customer whose password has been set. In this case, if the user is not a customer whose password for bill check has been set N (not illustrated), the text ARS server 30 proceeds with the text ARS as to whether a resident registration number for bill check has been pre-processed 530. If the user is a customer whose password for bill check has been set Y 522, the text ARS server 30 checks whether the password for bill check has been pre-checked 523. For example, if a result of checking whether the user's password for bill check has been pre-checked is Y (not illustrated), the text ARS server 30 proceeds with the text ARS as to whether a resident registration number for bill check has been pre-processed 530. As another example, if a result of checking whether the user's password for bill check has been pre-checked is N 524, the text ARS server 30 transmits, to the user device 40, an ARS text message corresponding to N as the result of checking whether a password for bill check has been pre-checked. In this case, the ARS text message may include, for example, "Please send your set password. #. Back to previous menu *. Back to the beginning." When receiving the set password from the user device 40, the text ARS server 30 determines password matching 525 for bill check.

For example, if a result of the password matching for bill check is N (not illustrated), the text ARS server 30 may transmit an ARS text message for requesting password re-entering to the user device 40. In this case, the ARS text message may include "The password you sent is incorrect. Please resend. #. Back to previous menu *. Back to the beginning." As another example, if a result of the password matching for bill check is Y (526), the text ARS server 30 proceeds with the text messages ARS as to whether a resident registration number has been pre-processed.

Figure 5C:
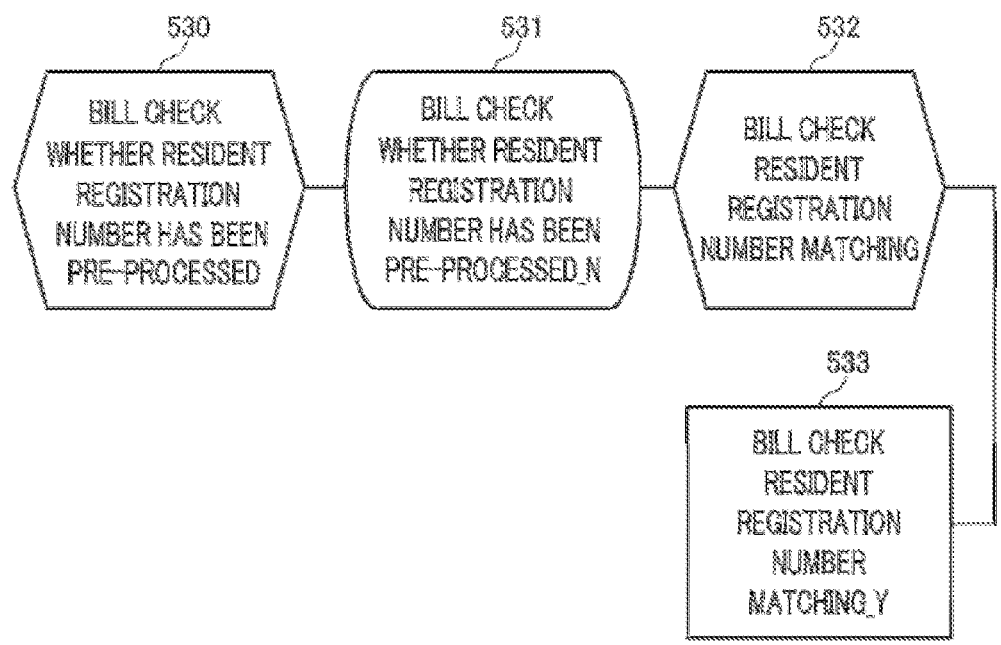

Referring to FIG. 5c, the text ARS server 30 may receive input of a resident registration number from the user device 40 to authenticate the user. The text ARS server 30 checks whether a user's resident registration number for bill check has been pre-processed 530. For example, if a result of checking whether the resident registration number for bill check has been pre-processed is Y (not illustrated), the text ARS server 30 proceeds with a billing branch checking step 540 of the text ARS. As another example, if a result of checking whether the resident registration number for bill check has been pre-processed 530 is N 531, the text ARS server 30 may transmit an ARS text message including "Please send the last 7 digits of your resident registration number for rapid processing. #. Back to previous menu *. Back to the beginning" to the user device 40.

When receiving a text message including the last 7 digits of the resident registration number from the user device 40, the text ARS server 30 determines resident registration number matching for bill check 532 to confirm whether the received resident registration number is identical to the user's resident registration number. For example, if a result of the resident registration number matching for bill check is Y 533, the text ARS server 30 proceeds with the billing branch checking step 540 of the text ARS.

As another example, if a result of the resident registration number matching for bill check is N (not illustrated), the text ARS server 30 may transmit an ARS text message for requesting re-entering of a resident registration number to the user device 40. In this case, the ARS text message may include "The resident registration number you sent is incorrect. Please resend. #. Back to previous menu *. Back to the beginning."

Figure 5D:
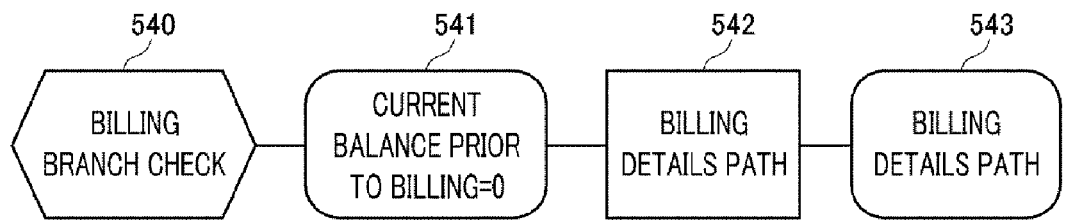

Referring to FIG. 5d, when the use authentication is confirmed, the text ARS server 30 may check the bill for the user device 40. The text ARS server 30 may check at least one billing branch of 'current balance prior to billing 541,' 'current balance after billing,' 'charges unpaid' and 'total charge.' For example, if the checked billing branch is 'current balance prior to billing=0 541,' the text ARS server 30 may transmit the ARS text message "1. Billing details #. Back to previous menu *. Back to the beginning" to the user device 40.

As another example, if the checked billing branch is 'current balance after billing,' the text ARS server 30 may transmit, to the user device 40, the ARS text message "Billing month: March Usage Period: February 21 to March 20 Amount to be paid: 80,000 Won Amount of partial payment: 0 Won Over payment may occur due to FREE card registration, charge adjustment, cash payment and others. 1. Billing details #. Back to previous menu *. Back to the beginning" to the user device 40. In this case, the 'current balance after billing' may be identical to the 'total charge.' As another example, if the checked billing branch is 'charge unpaid,' the text ARS server 30 may transmit the ARS text message "Total current monthly charge: 80,000 Won Unpaid amount that has been paid: 20,000 Won Monthly usage charge: 60,000 Won 1. Billing details #. Back to previous menu *. Back to the beginning" to the user device 40.

When receiving a text message including '1' corresponding to the billing details from the user device 40, the text ARS server 30 may check billing details for the user device 40 through a billing detail path 542. The text ARS server 30 transmits, to the user device 40, an ARS text message generated based on the checked billing details 543. In this case, the ARS text message may include "100,000 Won in total. 1. Additional service billing details #. Back to previous menu *. Back to the beginning."

Figure 5E:
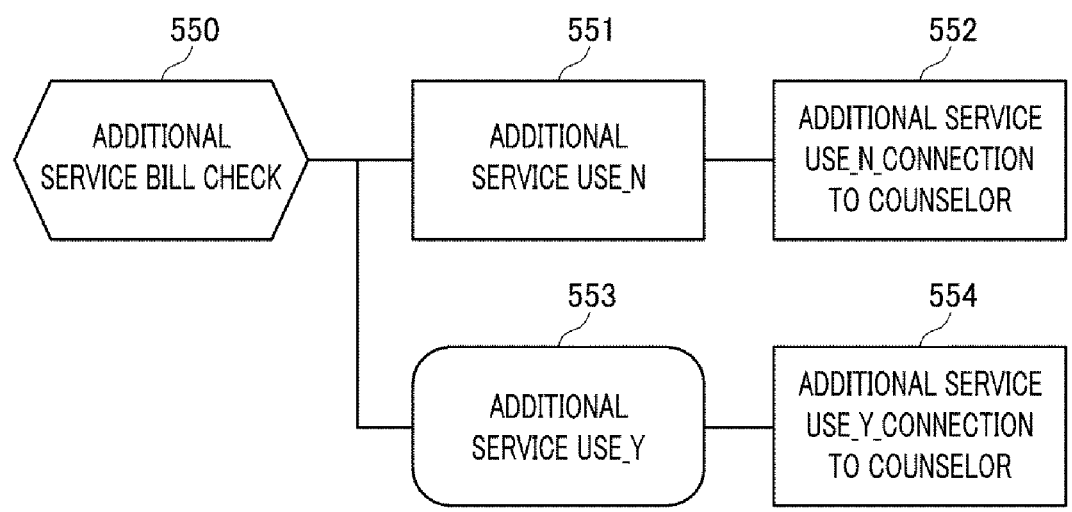

Referring to FIG. 5e, the text ARS server 30 may check an additional service bill for the user device 40, and provide the user device 40 with connection to a counselor. When receiving a text message including '1' corresponding to additional service billing details from the user device 40, the text ARS server 30 proceeds with a step of an additional service bill check result 550 of the text ARS.

For example, if checked additional service use is N 551, the text ARS server 30 may transmit the ARS text message "There is no additional service use for charge. 0. Counselor connection #. Back to previous menu *. Back to the beginning" to the user device 40. When receiving a text message including '0' corresponding to counselor connection from the user device 40, the text ARS server 30 proceeds with the 'additional service use N – counselor connection 552' step of the text ARS and transmits an ARS text message to the user device 40. In this case, the ARS text message may include "Please press the call button or dial 114 for counselor connection. #. Back to previous menu *. Back to the beginning."

As another example, if the checked additional service use is Y (553), the text ARS server 30 may transmit the ARS text message "30,000 Won. 0. Counselor connection #. Back to previous menu *. Back to the beginning" to the user device 40. When receiving a text message including '0' corresponding to counselor connection from the user device 40, the text ARS server 30 proceeds with the additional service use Y-counselor connection 554 step of the text ARS and transmits an ARS text message to the user device 40. In this case, the ARS text message may include "Please press the call button or dial 114 for counselor connection. #. Back to previous menu *. Back to the beginning."

FIG. 6 shows an example for an XML document generated by using the text ARS development tool in accordance with an example embodiment. Referring to FIG. 5a and FIG. 6, when receiving a text ARS initiation request from the user device 40, the text ARS server 30 transmits a text ARS menu to the user device 40. The text ARS server 30 may combine texts included in one of the XML document set received from the user device 40 to transmit an ARS text message including the text ARS menu to the user device 40. In this case, the XML document set is generated based on a menu tree, and the menu tree is generated to correspond to each menu based on a shape selected according to an attribute of each menu. The user device 40 may display a text ARS menu on a display like "Olleh mobile product messaging customer service center. Welcome, sir. 1. Billing check and payment service 2. Cell phone new subscription, number porting, device change and additional services, charge plan change, olleh club, membership 3. Inquiry on use of i-phone and i-pad and call quality 4. Loss, temporary suspension, handset insurance relevant inquiry and AS information 5. Inquiry on wired products of Internet, home phone, Wibro, etc. ?. Helps !. Usage information." In this case, a number of each of the text ARS menus is synchronized with the text ARS menu through message extensible markup language (MXML), and when receiving a text message including a number of a text ARS menu from the user device 40, the text ARS server 30 may transmit a text ARS submenu of the corresponding number to the user device 40. For example, when receiving a text message including '1' corresponding to the billing check and payment service from the user device 40, the text ARS server 30 may transmit an ARS text message including a submenu of the billing check and payment service to the user device 40. In this case, the submenu of the billing check and payment service may include at least one submenu of billing check, real-time current monthly charge check, remaining free call/free text message credit check, payment dedicated account information, FAX forward of a billing statement, and non-refunded amount check.

FIG. 7 is a flow diagram showing a text ARS service providing method that uses the text ARS development tool in accordance with an example embodiment. The text ARS providing method that uses the text ARS development tool in accordance with an example embodiment as illustrated in FIG. 7 includes the processes sequentially processed in the text ARS providing system 1 in accordance with an example embodiment as illustrated in FIG. 1A. Accordingly, the descriptions of the text ARS providing system 1 in accordance with an example embodiment as illustrated in FIG. 1A are applied to the text ARS providing method that uses the text ARS development tool in accordance with an example embodiment as illustrated in FIG. 7, though the descriptions are omitted hereinafter.

In S710, the manager device 20 generates a menu tree by using a web-based text ARS development tool. In S720, the manager device 20 generates a pre-defined XML document set based on the menu tree. In S730, the manager device 20 transmits the XML document set to the text ARS server 30. In S740, the text ARS server 30 combines texts included in one of the XML document set to transmit the texts to the user device 40.

The text ARS providing method that uses the text ARS development tool as described with reference to FIG. 7 can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A method for providing a text automatic response using a text ARS development tool, comprising:
    generating, by a manager device, a menu tree using a web-based text ARS development tool;
    generating, by the manager device, a pre-defined XML document set based on the menu tree that is generated to correspond to each menu based on a shape selected according to an attribute of each menu;
    transmitting, by the manager device, the XML document set to a text ARS server; and
    combining, by the text ARS server, texts included in one of the XML document set to transmit the texts to a user device.

2. The method of claim 1, further comprising:
    receiving, by the text ARS server, a text message from the user device;
    extracting, by the text ARS server, an XML document corresponding to the text message from the XML document set; and
    combining texts, by the text ARS server, included in the extracted XML document to transmit the texts to the user device.

3. The method of claim 1,
    wherein the generating of the XML document set comprises generating an XML document to correspond to each menu included in the menu tree.

4. The method of claim 1,
    wherein the attribute of the menu includes one or more of message delivery, conditional branch, input, and search.

5. A method for providing a text automatic response, comprising:
    receiving a request for a web-based text ARS development tool from a manager device; and
    providing the manager device with the web-based text ARS development tool;
    generating, by the manager device, a menu tree for a text ARS, wherein the menu tree is generated to correspond to each menu based on a shape selected according to an attribute of each menu;
    editing, by the manager device, the generated menu tree; and
    generating, by the manager device, a pre-defined XML document set based on the edited menu tree.

6. The method of claim 5,
    wherein the generating of the XML document set comprises generating an XML document to correspond to each menu included in the menu tree.

7. The method of claim 5,
    wherein the attribute of the menu includes one or more of message delivery, conditional branch, input, and search.

8. A method for generating XML using a text ARS development tool, comprising:
    transmitting a request for a text ARS development tool to a development tool providing server;
    receiving the text ARS development tool from the development tool providing server;
    generating a menu tree for text ARS by using the text ARS development tool, wherein the menu tree is generated to correspond to each menu based on a shape selected according to an attribute of each menu;
    editing the generated menu tree by using the text ARS development tool; and
    converting the edited menu tree into a pre-defined XML document set by using the text ARS development tool.

9. The method of claim 8,
    wherein the converting of the edited menu tree into the pre-defined XML document set comprises:
    generating an XML document to correspond to each menu included in the menu tree.

10. The method of claim 8,
    wherein the attribute of the menu includes one or more of message delivery, conditional branch, input and search.

11. A server for providing a text ARS development tool, comprising:
    a receiver configured to receive a request for a web-based text messages ARS development tool from a manager device; and
    a transmitter configured to provide the manager device with the web-based text ARS development tool,
    generating, by the manager device, a menu tree for a text ARS, wherein the menu tree is generated to correspond to each menu based on a shape selected according to an attribute of each menu;
    editing, by the manager device, the generated menu tree; and
    generating, by the manager device, a pre-defined XML document set based on the edited menu tree.

* * * * *